Patented Dec. 18, 1945

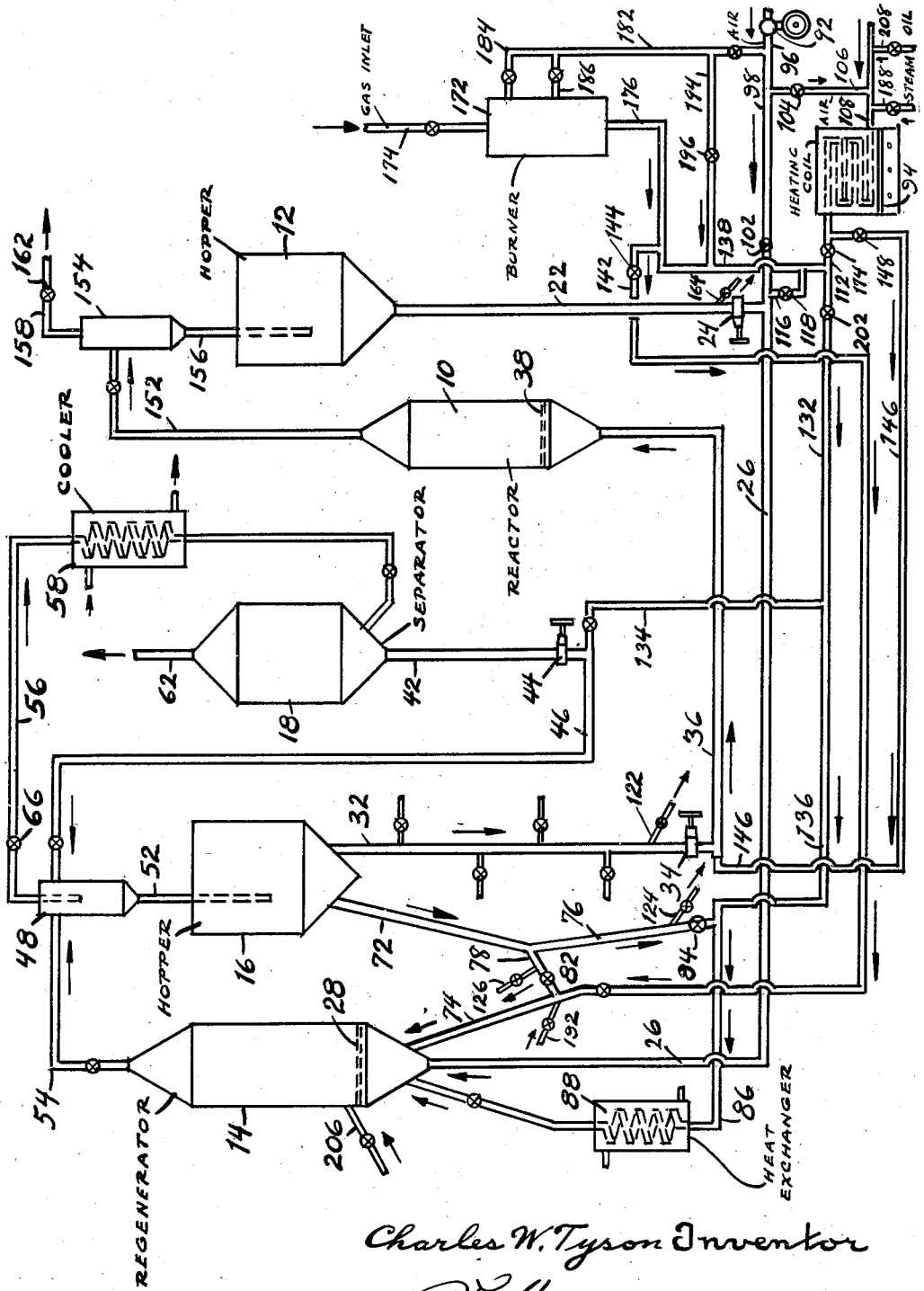

2,391,366

UNITED STATES PATENT OFFICE 2,391,366

CHEMICAL REACTIONS

Charles W. Tyson, Summit, N. J., assignor to Standard Oil Development Company, a corporation of Delaware Application June 15, 1943, Serial No. 490,831

7 Claims. (Cl. 196—52)

This invention relates to treating hydrocarbon fluids, and more particularly, relates to starting up the operation of a cracking or conversion unit using powdered catalyst.

When it is desired to start the operation of a conversion process using powdered catalyst, the whole unit is at atmospheric temperature. The conversion and regeneration of catalyst take place at relatively high temperatures and the whole system or unit must be brought up to these high temperatures uniformly and not too fast to avoid distortion and breakage of parts of the unit due to uneven expansion.

The starting up procedure requires from 6 hours to two days' time to prepare it for the cracking or conversion process. Where powdered catalyst is used, it is essential to have the whole system or unit heated up to above the condensation point of water before the powdered catalyst is introduced into the system to prevent agglomeration of the catalyst particles, plugging, etc.

According to my invention, heated air is first passed through the whole system, including the reaction side and regeneration side, until it is at a temperature of about 225 to 400° F. An auxiliary burner is then started and the supply of heated air to the regeneration side is replaced by hot combustion gases diluted with air. About this time the air going to the reaction side is replaced by superheated steam.

Then combustion gases from the auxiliary burner at a temperature of about 1250° F. are quenched with the cold catalyst which is then supplied to the regenerator side of the unit. In this way the cold catalyst is heated up quickly and heat is also supplied throughout the equipment.

The compressor used for supplying air during regeneration when the plant is operated for cracking oil is used for forcing hot air to the system during starting up and air to the auxiliary burner for supplying hot gases when the supply of hot air from the superheater is shut off. The superheater furnace used for heating the oil vapors to the reaction temperature during the cracking or conversion operation is used during starting up for heating air and later steam for preheating the whole unit.

In the drawing, the figure represents one form of apparatus which may be used in carrying out my invention.

Referring now to the drawing, the reference character 10 designates a reaction zone which is associated with a spent catalyst hopper 12. A regeneration zone 14 is associated with a regenerated catalyst hopper 16. A Cottrell precipitator 18 is also associated with the regenerated catalyst hopper.

The spent catalyst hopper 12 has a standpipe 22 provided with a control valve 24 for controlling the amount of spent catalyst passing through line 26 to the regeneration zone 14 during the use of the unit as a cracking and regenerating unit. The regeneration zone 14 is provided with a bottom distribution plate 28. The regenerated catalyst hopper 16 is provided with a standpipe 32 having a control valve 34 for controlling the amount of regenerated catalyst passing through line 36 to the reaction zone 10 during the operation of the unit for converting hydrocarbons. The reaction zone 10 is provided with a bottom distribution plate 38.

The Cottrell precipitator 18 is provided with a standpipe 42 having a control valve 44. Standpipe 42 communicates with line 46 which leads to a cyclone separator 48 which has a return pipe 52 for conducting separated catalyst particles to the regenerated catalyst hopper 16.

The regeneration zone 14 has a top outlet line 54 which leads to the cyclone separator 48. Preferably more than one cyclone separator is used and other forms of separating means may be used. The separated gas from the cyclone separator 48 passes through line 56 through a cooler 58 and then to the Cottrell precipitator 18. The Cottrell precipitator 18 has a top outlet line 62.

The regenerated catalyst hopper has a second standpipe 72 which branches into a bypass line 74 and a recycle line 76. The bypass standpipe 78 has a control valve 82. The recycle standpipe 76 has a control valve 84. The recycle line 86 connected with the recycle standpipe 76 is provided with a heat exchanger 88 for cooling regenerated catalyst being passed to the regeneration zone 14 during operation of the unit for conversion of hydrocarbons to control the temperature of the catalyst particles undergoing regeneration.

During use of the whole unit for cracking and regeneration, air is used for conveying the catalyst particles on the regeneration side and superheated steam and/or oil vapors are used for carrying the regenerated catalyst to the reaction side. A compressor is used for supplying the air under pressure. This compressor or blower 92 is used for passing the hot air through the system when the system is being started up.

A superheater furnace shown at 94 is used for heating oil vapors to the desired reaction temperature when the unit is being used for converting hydrocarbons. During starting up the superheater furnace is used for superheating air or later steam, which is used for conveying regenerated catalyst to the reaction zone 10.

With the whole system or unit at substantially atmospheric temperature, the starting up procedure forming my invention will now be described. The air line 96 which normally has a continuation 98 and a valve 102 for conducting spent catalyst from the bottom of the standpipe 22 to the regeneration zone 14 is used for conducting air under pressure from the compressor 92. The valve 102 is closed and valve 104 in branch line 106 is opened so that air under pressure passes through line 108 and superheater furnace 94. The air is heated to a temperature of about 1000° F. and is passed through the various parts of the equipment as will be presently described. The valve 24 in standpipe 22, valve 34 in regenerated catalyst standpipe 32, valve 84 in recycle standpipe 76 and valve 82 in bypass standpipe 78 are closed and valve 44 in the precipitator standpipe 42 is left open.

The heated air leaves the superheater through line 112 having valve 114. A portion of the heated air is passed through branch line 116 having valve 118 into line 26 below the valve 24 and the heated air is introduced into the bottom of the regeneration zone 14. The hot air passes through the outlet 54 to the cyclone separator 48.

The standpipe 32 is provided with a valved discharge line 122 for permitting escape of heated air in order to insure heating of the standpipe. Standpipe 76 has a valved discharge line 124 and bypass standpipe 78 has a valved discharge line 126. These discharge lines are located above the closed control valves 34, 84 and 82 in the respective standpipes. By opening valves 122, 124 and 126, hot air may be directed into the regenerated catalyst hopper 16 and into the standpipes 32, 76 and 78 to heat these parts of the system to the desired temperature.

Another portion of the hot air is passed through line 132 and branch line 134 into the line 46 below the opened valve 44 in the precipitator hopper standpipe 42. One portion of the heated air passes through line 46 to the cyclone separator 48 and another portion up standpipe 42, thus heating both the standpipe and return line. Hot air from the cyclone separator passes through line 56 and upwardly through the Cottrell precipitator 18.

Another portion of the heated air passing through line 132 is passed through line 136 and into the regenerated catalyst recycle line 86 below the control valve 84 in standpipe 76. This heated air also passes into the bottom portion of the regeneration zone 14.

Another portion of the hot air after leaving the superheater furnace 94 through line 112 is passed through line 38 and bypass line 142 having a valve 144 for conducting the hot air through the bottom portion of the regenerated catalyst bypass standpipe 78 and into line 74 which leads into the bottom portion of the regeneration zone 14.

Another portion of the heated air passes through branch line 146 which communicates with line 112 from the superheater furnace 94 ahead of the valve 114 in line 112. Line 146 has a valve 148. Line 146 conducts hot air to the bottom of standpipe 32 below control valve 34 and passes through line 36 to the bottom portion of the reaction zone 10. The hot air leaves the top of the reaction zone through line 152 and passes into a cyclone separator 154 having a return pipe 156 leading into the spent catalyst hopper 12. Preferably more than one cyclone separator is used and other forms of separating means may be used. The cyclone separator 154 has an outlet line 158 and a valve 162. By controlling the valve 162, some of the heated air is passed into the spent catalyst hopper 12 and into the standpipe 22 and is released to the atmosphere by valve 164 located above the closed control valve 24 in standpipe 22.

The heated air is continuously passed through the entire unit as above described until the outlet temperature at the various points is at least 300° F. or higher. At this point the further heating on the regeneration side is accomplished by an auxiliary burner 172 which has a feed inlet 174 at the top for introducing gaseous fuel or any other suitable fuel. The auxiliary burner has an outlet 176. The line 176 communicates with line 142 above described but the valves separate these systems as will be presently described.

Compressed air from line 96 is passed through manifold 182 into the auxiliary burner 172 through line 184 as primary air. Secondary air from line 182 is passed through line 186 to reduce the temperature of the combustion gases to from about 1000° F.–1250° F.

With the auxiliary burner in operation, the supply of air to the superheater furnace 94 is cut off by closing valve 104, and valve 114 in outlet line 112 is also closed. Steam is passed through line 188 into line 108 and superheater furnace 94 for superheating the steam to about 1000° F. The superheated steam is withdrawn through line 146 and into line 36. The superheated steam has now replaced the hot air passing through line 36 to the reaction side of the apparatus.

Returning now to the auxiliary burner which produces combustion gases at a temperature of about 1000° F., with the valve 14 in line 112 closed, hot combustion gases and excess air now replace the hot air first used on the regeneration side of the apparatus.

Steam is passed through the reaction side of the apparatus at such a rate that the temperature goes up slowly and the heating is continued until the reaction side is at a temperature of about 800 to 900° F.

The system is now ready for the introduction of catalyst and as the catalyst is at a relatively low temperature or at room temperature, it is necessary to supply additional heat to the part of the unit into which the cold catalyst is being introduced. Preferably the cold catalyst is introduced into regenerated catalyst bypass line 74 through line 192. The hot combustion gases being introduced into line 74 have their temperature increased in the following manner. The secondary air passing to the auxiliary burner through line 186 is reduced in relation to the amount of fuel fired so that the combustion gases leaving the burner through line 176 are at a temperature of about 1250° F.

These combustion gases at a temperature of about 1250° F. are then passed through line 142 and mixed with the cold catalyst, the mixture being passed through the bypass line 74 to the regeneration zone 14. The rest of the combustion gases from the auxiliary burner are passed through line 138 after being mixed with compressed air passing through line 194 having a valve 196. This air is fed from the line 182 and a sufficient amount of air is added to reduce the temperature of the combustion gases to about 1000° F. The fresh unused catalyst contains moisture and by preheating it in this way, excess moisture is removed from the catalyst.

The addition of catalyst is continued until a sufficient amount of catalyst is accumulated in regeneration zone 14 and in the regeneration catalyst hopper 16. This is the only place that catalyst is first accumulated. The catalyst introduced into the system may be circulated through the regenerator 14 and the regenerated catalyst hopper 16 through standpipes 72, 76 and 78 and cyclone separator 48 which returns the catalyst to the regenerated catalyst hopper. Before circulating the catalyst, it is, of course, necessary to open control valves 84 and 82 while at the same time closing discharge lines 124 and 126.

After the system has become heated up, valved discharge lines 122 and 164 are preferably closed. By circulating the catalyst in this way, the catalyst in the regenerated catalyst hopper is maintained hot. However, the circulation should not be too great as the heat loss is greater due to the higher temperature of the gases leaving the cyclone separator 48. After about 60% or more of the catalyst has been introduced and if the temperature of the catalyst is not less than 400° for acid-treated natural clays and about 600° F. for synthetic silica alumina gels, a heating or combustible oil is introduced into the regeneration zone 14 and the auxiliary burner is cut out.

To close the auxiliary burner, the supply of gas is shut off. Valve 196 in line 194 is closed. Valve 144 in line 142 remains open and valve 118 in line 116 is closed. Valve 102 in line 98 is then opened. With this arrangement, atmospheric air under pressure is passed into line 26 and also feeds through line 138 to line 132 and by another branch through line 142 so that atmospheric air under pressure is used on the regeneration side of the unit.

As above stated, when the auxiliary burner is turned off, heating oil is supplied to the regeneration zone 14. This oil may be any cheap combustible oil, such as gas oil, or may be any other hydrocarbon oil. The oil is passed through line 206 into the bottom portion of the regeneration zone 14 which now contains powdered catalyst. The regeneration zone is at a temperature of about 900 to 1000° F. and as there is sufficient air present, the oil burns and supplies heat to the catalyst in the regeneration zone. The catalyst is heated to about 1000 to 1050° F. whilst circulating it between the regenerated catalyst hopper 16 and the regenerator 14, and all of the catalyst is raised to about this temperature.

After this the unit is now ready for introducing hot catalyst to the reaction zone 10, and control valve 34 in standpipe 32 is opened to permit the flow of catalyst into line 36. Steam continues to flow through line 146 and the mixture in line 36 is a mixture of steam and catalyst which is passed into the reaction zone 10. Further amounts of cold catalyst are introduced into the bypass line 74 to make up for the heated catalyst being passed to the reaction zone.

This procedure is continued until the spent catalyst hopper 12 becomes substantially filled with hot catalyst. The control valve 24 in standpipe 22 is then opened to permit circulation of catalyst from the spent catalyst hopper 12 to the regeneration zone 14. When all of the catalyst has been added, the further addition of cold catalyst through line 192 into bypass line 74 is stopped. The catalyst is then slowly circulated through the whole system to get the whole system at about a uniform temperature of 800 to 1000° F. When the circulation has been maintained for some time, the system is ready for the introduction of oil which is to be cracked. Passage of steam through line 188 may be continued or discontinued as desired. The oil vapors from a flash tower are passed through line 208 into line 108 and through the superheater furnace 94 for heating the oil vapors to a temperature of about 800 to 950° F. The heated oil vapors at reaction temperature are then passed through line 146 and to the bottom of the regenerated catalyst standpipe 32 where they are mixed with the catalyst and the mixture introduced into the reaction zone 10.

After the catalyst particles pass through the reaction zone, they are contaminated with coke or carbonaceous material and they are then passed to the regeneration zone 14 where they are mixed with air and the carbonaceous deposit burned off. The regenerated catalyst is then accumulated in regenerated catalyst hopper 16. A portion of the regenerated catalyst is passed through bypass line 74 to the regenerator 14 and another portion is cooled by passing through the recycle line 86 and heat exchanger 88 for controlling the temperature during regeneration.

Instead of passing oil vapors through line 208 a reduced crude or other heavy oil may be heated in a vaporizer furnace, flashed in a flash tower and the vapors then taken overhead through line 208 to the superheater furnace 94. Instead of using vapors, liquid oils which contain non-vaporizable constituents, or if they are entirely vaporizable, may be preheated to a temperature of about 100 to 600° F. and mixed as liquids or liquid and vapor mixtures with the regenerated catalyst from line 32. The regenerated catalyst is at a sufficiently high temperature to vaporize the stock and also to supply the heat of reaction.

The standpipes and hoppers are preferably aerated.

While I have shown a preferred form of my invention, it is to be understood that various changes and modifications may be made without departing from the spirit of my invention.

I claim:

1. In a starting up procedure for a hydrocarbon conversion unit substantially at atmospheric temperature and using fluidized powdered catalyst to be continuously circulated during the conversion process in a closed cycle through a reaction zone and a regeneration zone for the spent catalyst, the steps of passing heated air through the entire unit prior to the introduction of powdered catalyst until a temperature above about 225° F. is obtained for the entire unit, then substituting superheated steam for air going to said reaction zone to displace the air and to prepare the reaction zone for hydrocarbon conversion and then adding powdered catalyst to said regeneration zone while continuing the heating with heated air.

2. In a starting up procedure for a hydrocarbon conversion unit substantially at atmospheric temperature and using fluidized divided catalyst particles to be continuously circulated during the conversion process in a closed cycle through a reaction zone and a regeneration zone for the spent catalyst, the steps of passing heated air through the entire unit prior to the introduction of powdered catalyst until a temperature above about 225° F. is obtained for the entire unit, substituting freshly produced combustion gases at about 1000° F. for the part of the heated air going to the regeneration side and substituting steam for the remaining heated air going to the reaction side, adding cold catalyst particles to said regeneration zone, mixing at least a portion of the combustion gases at a temperature of about 1250° F. with the cold catalyst particles being added to said regeneration zone to heat the catalyst particles and to add heat to the system without overheating it.

3. A starting-up procedure for heating up a reaction zone, a regeneration zone and associated parts substantially at atmospheric temperature and designed for the continuous circulation of fluidized powdered catalyst in a cycle through said zones and associated parts which comprises heating air to about 1000° F. and passing it through the entire system prior to the introduction of powdered catalyst, continuing heating with air until the temperature at the outlets is over about 250° F., substituting superheated steam for the portion of the air going to the reaction side, introducing cold divided solid catalyst on the regeneration side and circulating it on this side until the catalyst particles are heated to about 600° F., adding combustible fuel to said regeneration zone to raise the temperature of the catalyst particles in said regeneration zone to about 1000° F. and then passing the catalyst particles to the reaction side and recycling the catalyst particles through the whole unit until the desired temperature is obtained.

4. A procedure as defined in claim 3 wherein the heated air on the regeneration side is replaced by hot freshly produced combustion gases and another portion of hotter freshly produced combustion gases is used for admixture with the cold catalyst particles on the regeneration side, the addition of combustion gases to said regeneration zone being discontinued when combustible fuel is added to said regeneration zone.

5. A starting-up procedure for heating up a reaction zone, a regeneration zone and associated parts substantially at atmospheric temperature and designed for the continuous circulation of fluidized powdered catalyst in a cycle through said zones and associated parts which comprises heating air to about 1000° F. and passing it through the entire system prior to the introduction of powdered catalyst, continuing heating with air until the temperature at the outlets is over about 250° F., substituting superheated steam for the portion of the air going to the reaction side, replacing the heated air on the regeneration side with hot combustion gases, introducing cold catalyst on the regeneration side and circulating it on this side until the catalyst is heated to about 600–800° F., and using another portion of hotter combustion gases for admixture with the cold catalyst on the regeneration side for supplying additional heat to the unit.

6. A procedure according to claim 5 wherein the introduction of combustion gases is replaced by compressed atmospheric air on the regeneration side and oil vapors are introduced into said reaction zone to begin the continuous conversion operation followed by continuous regeneration of the spent catalyst particles.

7. In a starting-up procedure for a catalytic cracking plant substantially at atmospheric temperature and using fluidized powdered catalyst wherein a regeneration zone, regenerated catalyst standpipe and hopper, a bypass line between the regenerated catalyst hopper and regeneration zone, a reaction zone, a spent catalyst hopper and standpipe and associated parts are provided and wherein the powdered catalyst is to be continuously circulated during the conversion process in a cycle comprising said zones, hoppers and standpipes, the steps of passing air through a superheater furnace and passing the heated air through all parts of the plant until an outlet temperature of about 250° F. is obtained, replacing heated air on the regeneration side with freshly produced hot combustion gases from an auxiliary burner, replacing air passing through said superheater by steam and passing the superheated steam to the reaction side of the plant, adding cold catalyst to said regeneration zone, recirculating the catalyst between said regeneration zone and regenerated catalyst hopper, and then passing it to said reaction zone while continuing addition of cold catalyst to said regeneration zone, adding further heat to said regeneration zone, replacing the combustion gases on the regeneration side with compressed atmospheric air and replacing the steam by oil vapors heated in said superheater furnace so that the plant is ready for a continuous cracking and regeneration operation.

CHARLES W. TYSON.